Feb. 14, 1933. E. OSTRANDER 1,897,329
TRAMWAY CARRYING PULLEY
Filed Nov. 2, 1931
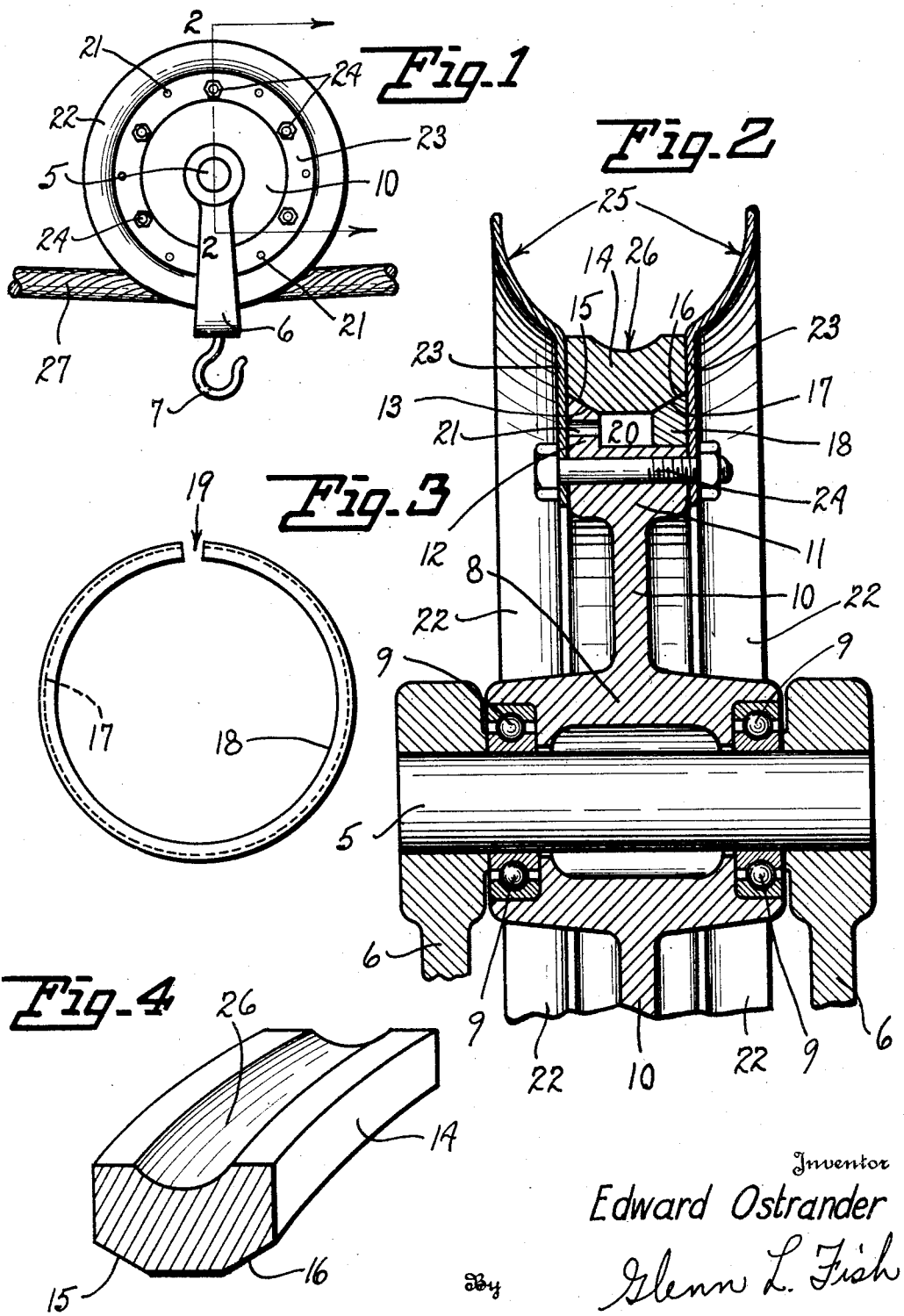
Inventor
Edward Ostrander
Glenn L. Fish
Attorney Patented Feb. 14, 1933

1,897,329

UNITED STATES PATENT OFFICE

EDWARD OSTRANDER, OF CHEWELAH, WASHINGTON, ASSIGNOR OF ONE-HALF TO ROYAL N. RIBLET, OF SPOKANE, WASHINGTON

TRAMWAY CARRYING PULLEY

Application filed November 2, 1931. Serial No. 572,711.

My invention relates to tramway carrying pulleys and certain objects of the invention are to overcome the objectionable features of pulleys whose wheels are cast in one piece and, due to faulty or imperfect casting, soon wear away and become irregular and inefficient. Further objects are to provide a pulley having a detachable rim-plate made of hard steel and which may be readily removed and replaced. Still further objects are to provide novel locking or securing means whereby the detachable rim-plate is fastened very securely to the rim of the pulley wheel.

With the above and other objects in view which will appear as the description proceeds, the invention consists of the novel construction, adaptation, combination and arrangement of parts hereinafter described and claimed. These objects are accomplished by devices illustrated in the accompanying drawing, wherein:—

Figure 1 is a general view in side elevation showing my pulley mounted on a cable;

Fig. 2 is an enlarged view in transverse vertical section taken substantially on a broken line 2, 2 of Fig. 1;

Fig. 3 is a detail view in side elevation of the locking ring; and

Fig. 4 is a detail view in perspective showing a portion of the rim-plate.

Referring to the drawing throughout which like reference numerals indicate like parts, the numeral 5 designates the axle of the pulley which has the usual yoke 6 pivotally suspended from its end portions and provided with the ordinary hook 7. The hub 8 of the pulley wheel is revolubly mounted on said axle and ball bearings 9, or other suitable anti-friction means are used for the bearing of the hub as will be understood.

The usual web portion 10 centrally and integrally connects the hub 8 with the rim 11. The periphery of said rim is cut away to form on one side thereof a projecting spur portion 12 whose outer face is beveled or slanted inwardly as at 13. An annular rim-plate 14, of the same width as the rim 11, has one of its inner edges beveled, as at 15, to snugly fit the bevel 13 of the spur portion 12. The other inner edge of said rim-plate is like-wise beveled, as at 16, to snugly fit the correspondingly beveled face 17 of a locking ring 18.

The locking ring 18 corresponds in cross section with the spur portion 12. Said ring is preferably made of spring metal and is a split ring being provided with a small space between its abuting ends as shown at 19 in Fig. 3. Thus when the ring is sprung into place, as shown in Fig. 2, this small space together with an annular space 20 left between the spur portion and the rim-plate 14, permits some adjustment of said ring. Holes 21 are provided in spaced apart relation through the spur 12 whereby the locking ring may be detached or pushed out by inserting a pointed instrument through said holes.

After the rim-plate 14 and the locking ring 18 have been installed in place, as shown in Fig. 2, a pair of corresponding annular side plates 22 are installed. Each of said side side-plates have corresponding inner flanges 23 which overlap the rim 11 and rim-plate 14. Said plates are secured by a plurality of spaced apart bolts 24 passing through their inner flanges and through the rim 11. When said bolts are set up tightly the inner flanges of one of said side plates presses against the locking ring 18 and forces it inwardly. Said ring thus acts as a wedge and its beveled face jams against the beveled edge of the rim-plate thus securing said rim-plate strongly in place and eliminating any danger of slippage.

The peripheries of the side plates 22 are dished as at 25, and the periphery of the rim-plate 14 is grooved as at 26, thus providing ample bearing for a cable 27 on which the pulley rides as shown in Fig. 1. It will be apparent that the assembly of the different elements comprising my pulley is very easily and quickly made. The rim-plate 14 is made of very hard metal, such as tool steel or the like, for the purpose of resisting wear. Upon becoming worn said rim-plate may be readily detached and replaced by a new one.

Having thus described my invention, it being understood that minor changes in its construction and arrangement may be resorted to without departing from the scope and spirit of the invention, what I claim and desire to secure by Letters Patent of the United States is :—

A tramway carrying pulley comprising in combination a pulley wheel having a beveled spur portion on one side of its rim, an annular rim-plate having inner beveled edges with one of said edges seated against the beveled spur portion, a resilient split-ring having a beveled edge seated against the other inner beveled edge of the rim-plate, and annular side-plates secured against the pulley rim and the rim-plate whereby the split-ring is forced into wedge-like engagement between the pulley rim and the rim-plate.

In testimony whereof I affix my signature.

EDWARD OSTRANDER.